INVENTOR.
JAMES T. WARNOCK
BY [signature]
ATTORNEY

INVENTOR.
JAMES T. WARNOCK
BY
Dean V. Hazeltine
ATTORNEY

INVENTOR.
JAMES T. WARNOCK
BY
[signature]
ATTORNEY

INVENTOR.
JAMES T. WARNOCK
BY
[signature]
ATTORNEY

Nov. 7, 1961 J. T. WARNOCK 3,008,124

SYSTEM FOR TRANSMISSION AND RECEPTION OF BINARY DIGITAL INFORMATION

Filed Feb. 23, 1956 5 Sheets-Sheet 5

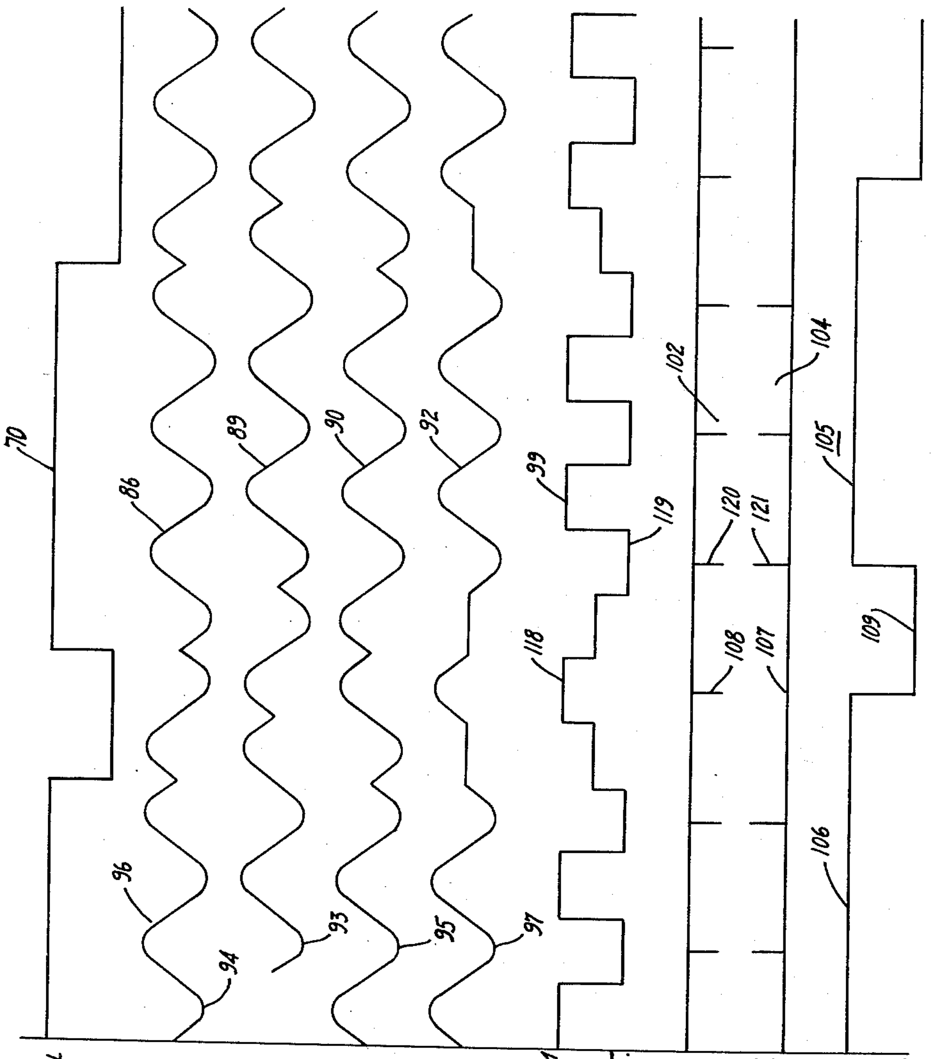

WAVEFORM OF ORIGINAL TWO-LEVEL SIGNAL FIG. 10.

RECEIVED BIPHASE WAVEFORM FIG. 11.

DELAYED BIPHASE WAVEFORM FIG. 12.

INVERTED BIPHASE WAVEFORM FIG. 13.

SUM OF WAVEFORMS OF FIGS. 12 AND 13. FIG. 14.

WAVEFORM DERIVED FROM WAVEFORM OF FIG. 14. AFTER AMPLIFICATION AND LIMITING. FIG. 15.

GATING PULSES FIG. 16.

GATE OUTPUT FIG. 17.

RECOVERED TWO-LEVEL SIGNAL FIG. 18.

INVENTOR.
JAMES T. WARNOCK

BY Dean V. Haseltine

ATTORNEY 3,008,124

SYSTEM FOR TRANSMISSION AND RECEPTION OF BINARY DIGITAL INFORMATION

James T. Warnock, Havertown, Pa., assignor to Philco Corporation, Philadelphia, Pa., a corporation of Pennsylvania Filed Feb. 23, 1956, Ser. No. 568,421
8 Claims. (Cl. 340—170)

This invention relates to an improved system for the transmission and reception of binary digital information.

In any system for the transmission and reception of binary digital information, the binary pulse signal containing the information is transformed into a two-level binary signal in which one level represents the presence of pulses and the other level represents the absence of pulses. The rate of occurrence of binary digits is known as the baud rate. Each binary digit is represented by a pulse or an absence of a pulse in the original binary pulse signal, and by the corresponding portion of the two-level signal.

While it is possible to transmit the two-level binary signal, such a signal is not well suited for space transmission. As it is essentially a D.-C. signal, it contributes no appreciable amount of energy to a modulated carrier signal, and therefore the energy must be supplied almost entirely by the carrier signal. A more advantageous method generally employed in the past is the so-called dipulse method of transmission. In the dipulse system, one cycle of sine wave is produced for each high level portion of the two-level signal corresponding to a binary digit, and no signal is produced for the low level portions of the two-level signal. The resulting signal is then transmitted, usually as amplitude modulation of a high frequency carrier, and is employed at the receiver, after demodulation, to reproduce or recover the two-level binary signal. While the dipulse system is advantageous in that the modulating signal contributes appreciable energy to the modulated carrier signal, a serious objection of the system is its susceptibility to the effects of noise.

Accordingly, the principal object of the present invention is to provide an improved system, for the transmission and reception of binary digital information, which overcomes the objections of prior systems, particularly the noise susceptibility of the dipulse system.

In accordance with this invention, the transmission of binary digital information is performed by means of a biphase information signal having binary components of different phase representative respectively of the two binary digits, the frequency of the biphase signal corresponding to the baud rate of the two-level binary signal. Preferably, as hereinafter described, the said components of the biphase signal are of opposite phase.

A further object of the invention is to provide a system by which the biphase signal may be produced from the two-level binary signal.

This invention achieves an increase in side band energy of approximately two-to-one over that of the dipulse system. This is due to the fact that both levels of the two-level binary signal are represened by components of the biphase signal, whereas in the dipulse system only one level of the two-level signal is represented in the transmitted signal. Consequently, the system of this invention will operate with one-half the signal-to-noise ratio required for the dipulse system.

From the foregoing, it will be understood that the biphase signal of the present invention is characterized in that each cycle represents a binary digit and each change of phase represents a change in level of the two-level binary signal. The biphase signal is transmitted, preferably as amplitude modulation of a high frequency carrier, and is utilized at the receiving station, after demodulation, to reproduce or recover the two-level binary signal. In the reproduction of the two-level binary signal, it is necessary to establish therein the proper baud rate, and it is also necessary to produce the proper level for each phase of the biphase signal and the proper change of level for each change of phase of the biphase signal.

In its broader aspect, the invention contemplates that the reproduction of the two-level binary signal at the receiving station may be performed in any suitable manner. Preferably, however, it is performed by producing two pulse signals, one fixedly related in frequency and phase to the biphase signal and the other indicative of the phase changes in the biphase signal, and by utilizing the two pulse signals to reproduce the original two-level binary signal. In order to establish the proper phase of the first pulse signal, a synchronizing signal may be transmitted immediately prior to the transmission of the biphase signal. The production of the first pulse signal may then be performed by means of the method and system disclosed and claimed in a copending application of J. A. Ingham, Serial No. 569,767, filed March 6, 1956, now Patent No. 2,939,914.

A further object of this invention, therefore, is to provide a system by which the original two-level binary signal may be reproduced from the biphase signal.

Other objects and features of the invention will be apparent from the following description of a preferred embodiment illustrated in the accompanying drawings.

Reference is now made to the accompanying drawings, wherein

FIGURES 5 to 18 show waveforms of signals which are produced at various points in the system.

Figure 1:
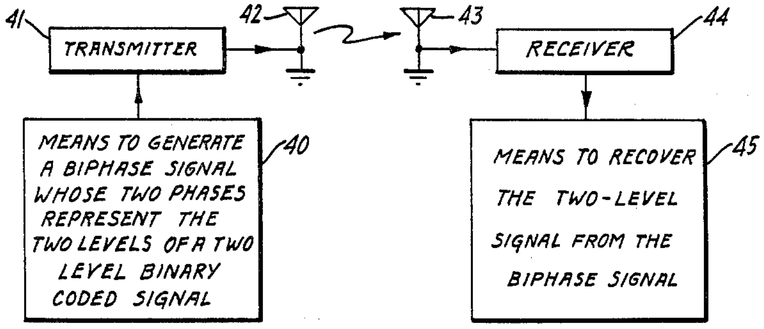
FIGURE 1 is a general representation of a system according to this invention.

Referring first to FIGURE 1, block 40 represents broadly apparatus, at the transmitting station, the principal function of which is the production of a biphase signal according to this invention, in which signal two different phases represent respectively the two levels of the two level binary signal. It will be understood that the frequency of the biphase signal corresponds to the baud rate of the two-level binary signal; that is to say, the period of one complete cycle of the biphase signal is equal to the period of one baud or binary digit. The binary digit "1" may be represented in the biphase signal by one complete cycle of a particular phase, while the binary digit "0" may be represented in the biphase signal by one complete cycle of a different phase.

The biphase signal is caused to modulate the amplitude of a high frequency carrier in the transmitter 41, and the modulated carrier is then transmitted by means of the antenna 42. At the receiving station, the modulated carrier is received by the antenna 43 and is supplied to the receiver 44 wherein demodulation is performed to obtain the biphase signal. Block 45 represents the apparatus at the receiving station for recovering from the biphase signal the original two-level binary signal.

Figure 2:
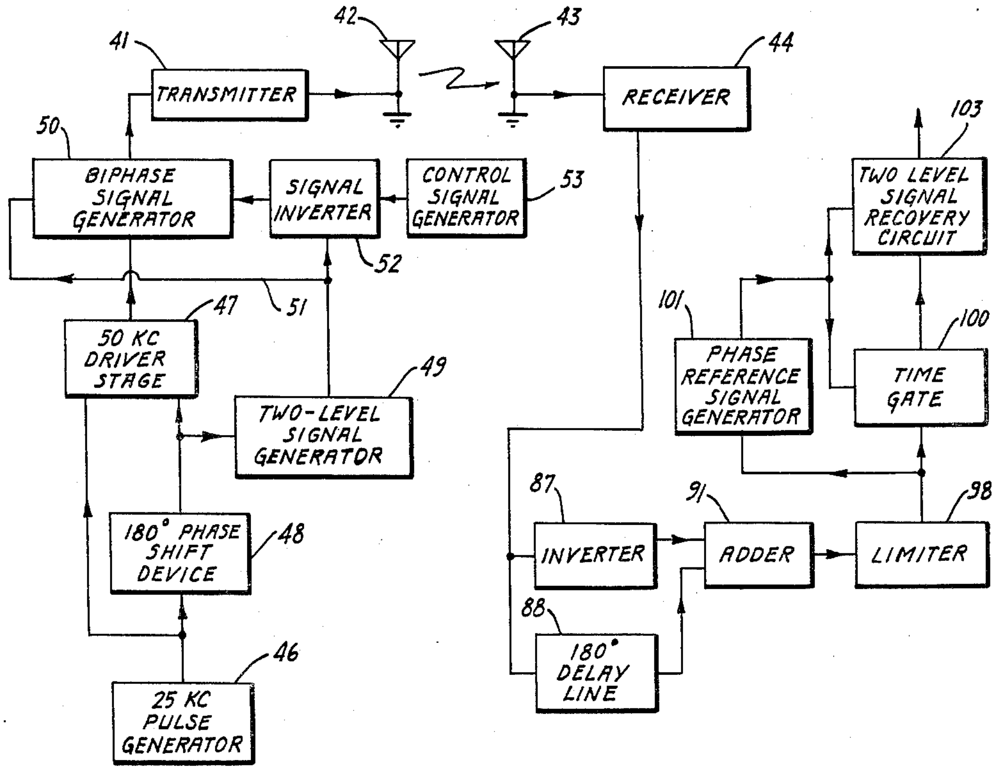
FIGURE 2 is a block diagram of the system.

Referring now to FIGURE 2, in the illustrated system, the baud rate employed is 25-kc., and there is provided a 25-kc. pulse generator 46 which supplies pulses of known phase to a 50-kc. driver stage 47 directly and also through a 180° phase shift device 48 to produce a 50-kc. pulse signal. At the same time, the phase-shifted pulses from device 48 are supplied to a two-level signal generator 49 from which is derived a two-level binary signal whose binary digital information it is desired to transmit, and whose baud rate is 25-kc.

The 50-kc. pulse signal from driver stage 47 is supplied to the central terminal of a biphase signal generator 50 which, as hereinafter described, includes an Eccles-Jordan circuit. At the same time, the two-level binary signal from generator 49 is supplied directly to one side terminal of the signal generator 50 over conductor 51, and is also supplied to the other side terminal of the signal generator 50 through a signal inverter 52. The signal generator 50 functions, in response to the signals supplied thereto, to produce a biphase signal whose phases represent respectively the two levels of the two-level binary signal supplied from generator 49. The signal generator 50 also serves to produce the synchronizing signal, hereinbefore mentioned, under control of a signal generator 53.

Figure 3:
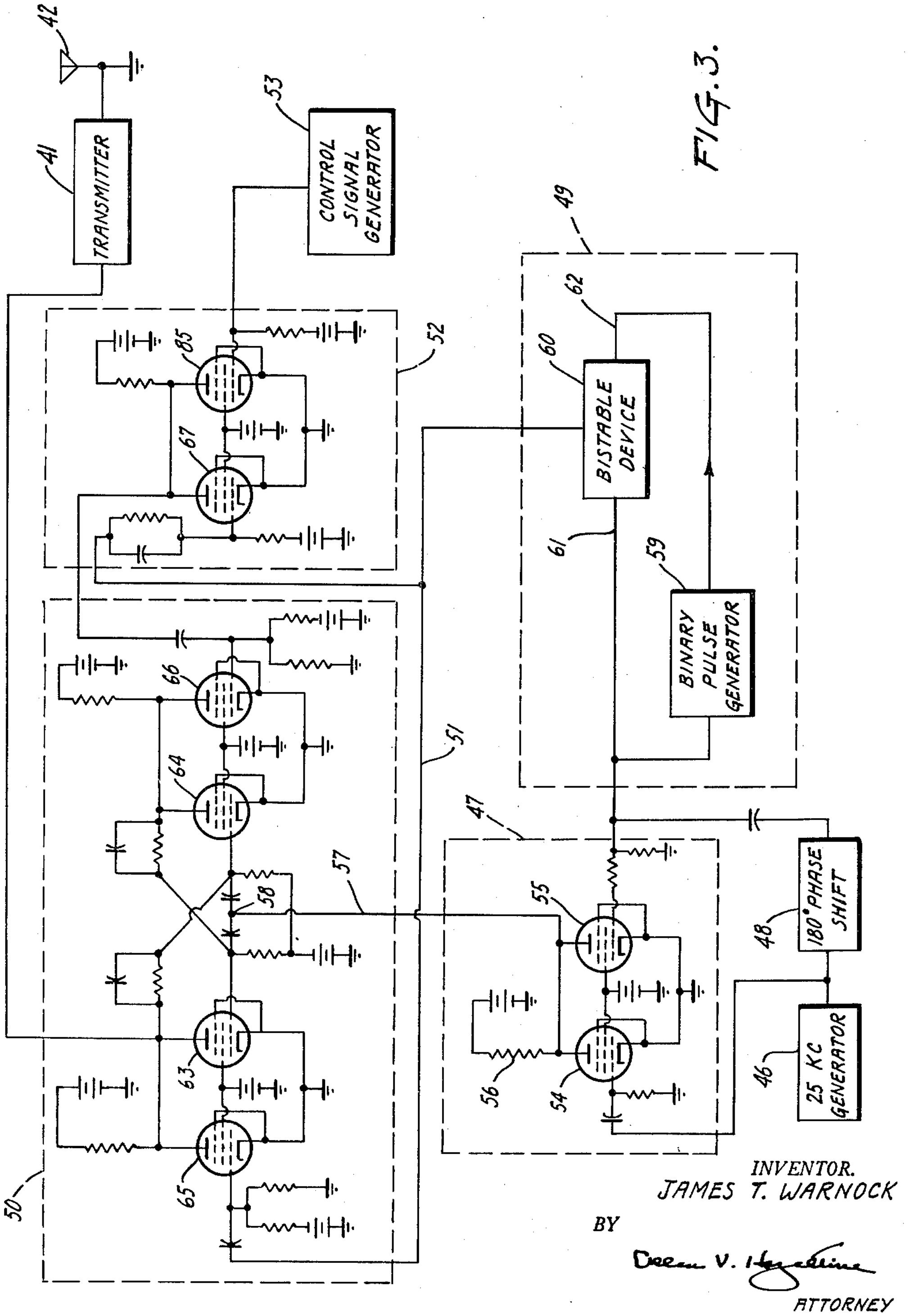
FIGURE 3 is a sufficiently detailed illustration of the apparatus at the transmitting station to enable a clear understanding thereof.

Referring now to FIGURE 3 which shows in greater detail the apparatus at the transmitting station, it will be seen that the driver stage 47 is in the form of a simple combining circuit comprising two tubes 54 and 55, whose cathodes are grounded and whose plates are connected to the common plate resistor 56. The 25-kc. pulse signal from generator 46 is applied directly to the control grid of tube 54, and is supplied through the 180° phase shift device 48 to the control grid of tube 55. Since the two applied signals are 180° out of phase with one another, a 50-kc. pulse signal is produced at the common plate connection, and this signal is applied over conductor 57 to the central terminal 58 of the signal generator 50.

The two-level signal generator 49 comprises a conventional binary pulse generator 59 and a bistable device 60 which may be a conventional Eccles-Jordan circuit that is responsive to two input signals supplied to its terminals 61 and 62. The output of the binary pulse generator 59 is an information signal comprising coded binary digits occurring at the baud rate of 25-kc., the binary digits being either pulses or time spaces having no pulses. The output signal from generator 59 is supplied to the terminal 62 of the Eccles-Jordan device 60. At the same time, 25-kc. pulses from generator 46 are supplied to terminal 61 of the device 60. These latter pulses tend to cause the device 60 to assume one of its stable states, while the pulses from generator 59 tend to cause the device 60 to assume its other stable state. The pulses from generator 59 are predominant, as they begin before and end after coincident pulses supplied to terminal 61. It may be said that the bistable device 60 is biased toward one of its stable states by the 25-kc. pulses supplied to its terminal 61, but it is caused to assume its other stable state whenever any pulse or pulses are supplied from the generator 59. Consequently, the output of the device 60 is a two-level signal having the binary code or pattern of the binary pulse signal supplied by generator 59, and having a baud rate of 25-kc.

As hereinbefore mentioned, the two-level signal from the generator 49 is supplied directly to the left hand side of the signal generator 50 over conductor 51, and is also supplied in inverted form to the right hand side of the signal generator. The central portion of the signal generator 50, comprising tubes 63 and 64 and their associated circuit components, is a conventional Eccles-Jordan circuit which is operable by pulses supplied to terminal 58 and is controllable by reset tubes 65 and 66. Each of the latter tubes is normally biased to cut-off, but each positive-going portion of the two-level signal supplied to its grid circuit is differentiated by the differentiating network therein and causes the tube to apply a negative pulse to the Eccles-Jordan circuit.

The signal inverter 52, by which the inverted two-level signal is supplied to the control grid circuit of tube 66, comprises a simple inversion stage including tube 67 and the associated elements. As will be well understood, the two-level signal supplied to the input of tube 67 from generator 49 will appear in inverted form in the output of said tube, whence it is supplied to the control grid circuit of tube 66.

Figures 5, 6, 7, 8, 9:
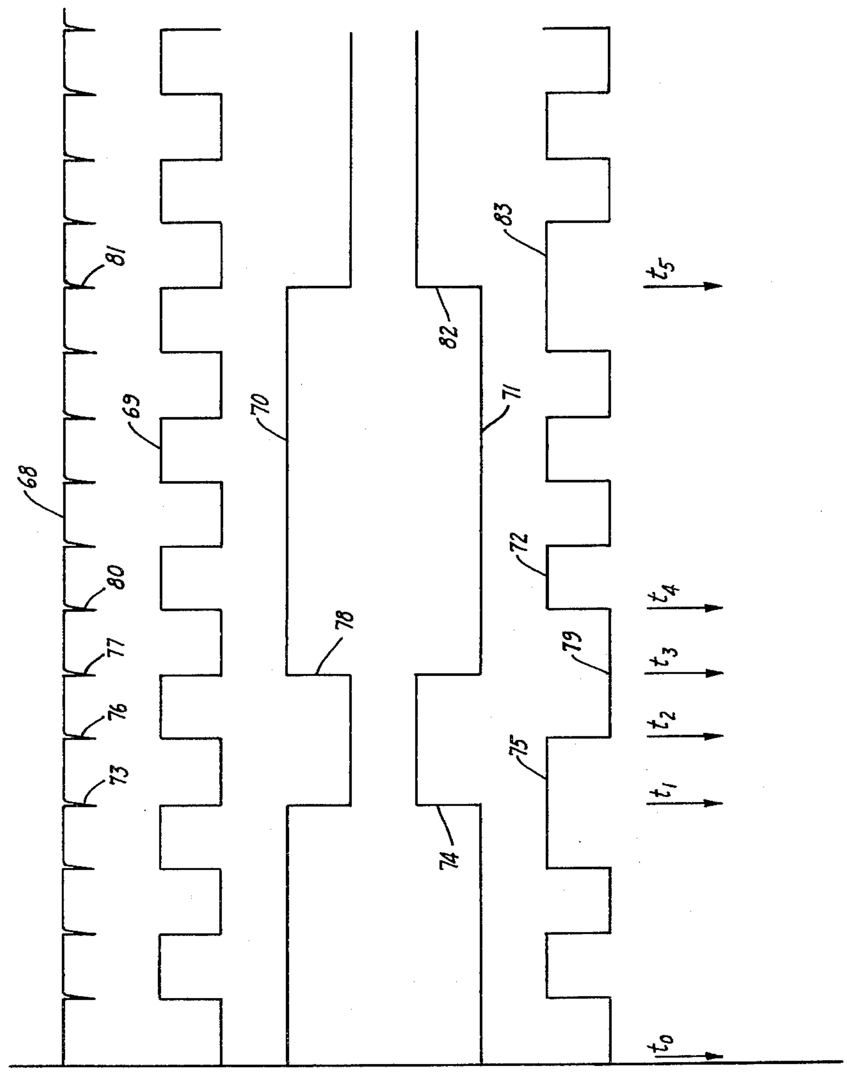

The manner in which the biphase signal is produced by signal generator 50 may now be clearly understood with the aid of FIGURES 5 to 9. FIGURE 5 shows the 50-kc. pulse signal 68 which is supplied to the central terminal 58 of the signal generator 50 from the driver stage 47. FIGURE 6 shows the 25-kc. signal 69 which would be produced by the Eccles-Jordan circuit of generator 50, in response to signal 68, in the absence of any other signal supplied to said generator. FIGURE 7 shows the two-level binary signal 70 as supplied to the left hand side terminal of the signal generator 50. FIGURE 8 shows the two-level binary signal 71 as supplied to the right hand side terminal of the signal generator 50. FIGURE 9 shows the biphase signal 72 which is produced by the signal generator 50 in response to the signals supplied thereto.

Considering the operation, prior to a change in level of the two-level signal, that is, during the time interval between time $t_0$ and time $t_1$, the Eccles-Jordan circuit of generator 50 responds solely to the pulses of signal 68. For the present, it may be assumed that the Eccles-Jordan circuit is correctly phased; in fact this is insured as will be seen later. At time $t_1$, the pulse 73 tends to cause the output of the Eccles-Jordan circuit to change from its high level to its low level, but the positive-going portion 74 of signal 71 prevents such change and causes the output signal 72 to remain at its high level, as shown at 75. Thus, at time $t_1$ the phase of the output signal is shifted 180°. At time $t_2$, the pulse 76 causes the output signal output signal to change to its lower level, there being no change in level of the two-level signal. At time $t_3$, pulse 77 tends to cause the output signal to change to its upper level, but the positive-going portion 78 of signal 70 prevents such change, and therefore the phase of the output signal is again shifted as shown at 79. At time $t_4$, pulse 80 causes the output signal to change to its upper level, and thereafter until time $t_5$ the Eccles-Jordan circuit responds only to the pulses of signal 68 because there is no change in level of the two-level signal. At time $t_5$, the pulse 81 tends to cause the output signal to change its low level, but the positive-going portion 82 of signal 71 prevents such change, and therefore the phase of the output signal is again shifted at 83. Following time $t_5$, the Eccles-Jordan circuit responds only to the pulses of signal 68 until the next change of level of the two-level signal.

Thus it will be seen that the output signal of the Eccles-Jordan circuit changes its phase each time there is a change in level of the two-level binary signal. Consequently, the desired biphase signal is produced, in which components of opposite phase are representative respectively of the two levels of the two-level signal. The biphase signal is supplied to the transmitter 41.

As hereinbefore mentioned, in order to enable recovery of the two-level signal at the receiver, it is preferred to transmit a synchronizing signal immediately preceding the transmission of the biphase intelligence signal. This may be done by utilizing a broad D.-C. control signal from generator 53. To this end, a control tube 85 (FIG. 3) is associated with tube 67, as shown, and the positive D.-C. control signal from generator 53 is supplied to the control grid of tube 85. This control signal is simply a D.-C. voltage of a duration corresponding to the desired duration of the synchronizing signal. Hence the generator 53 may comprise simply a battery and a switch. Tube 85 is grid-biased to cut-off so that it normally has no effect upon the operation of tube 67; but when the positive control signal is supplied to its control grid, tube 85 conducts heavily and insures that a large voltage drop will be present across the common plate load resistor of the two tubes. Consequently, for the duration of the positive D.-C. signal supplied to the control grid of tube 85, the Eccles-Jordan circuit will respond to the 50-kc. pulses from the driver stage 47 to produce single phase 25-kc. signal such as shown in FIG. 6. Moreover, it should be noted that the correct phase of this signal is insured at the outset by reason of the signal supplied from device 60 to the grid circuit of tube 65. If the Eccles-Jordan circuit is not correctly phased, the pulse supplied by tube 65 will cause it to change its phase.

From the foregoing description, it will be seen that in operation a single-phase synchronizing signal is first transmitted which has a predetermined phase, and the biphase information signal is then transmitted which has a baud rate corresponding to said frequency, and one of the phases of which corresponds to the phase of the synchronizing signal.

Referring now to the receiving station as shown in block form in FIG. 2, the modulated carrier is received by the receiver antenna 43 and is supplied to the receiver 44 which demodulates the signal to reproduce the biphase signal as represented by the waveform 86 in FIG. 11. Although this signal is actually the same signal as shown in FIG. 9, its component cycles become substantially sinusoidal in transmission. For convenience of comparison, the original two-level binary signal 70 is shown in FIG. 10 just above the biphase signal 86. As shown in FIG. 2, the biphase signal 86 is supplied to an inverter 87 and also to a delay line 88 which are in parallel relation with one another. The delay line 88 produces a waveform 89 shown in FIG. 12, while the inverter 87 produces the waveform 90 shown in FIG. 13. These two signals are added in the adder 91 to produce the resultant signal 92 shown in FIG. 14.

Due to the fact that the resultant signal 92 is composed of the inverted signal and the delayed signal, the effect of noise pulses is considerably lessened. This may be explained as follows. Each half cycle of the waveform 92 of FIG. 14 is composed of two adjacent half cycles of the waveform 86. For example, the half cycle 93 of waveform 89 corresponds to the half cycle 94 of waveform 86, and the half cycle 95 of waveform 90 corresponds to the half cycle 96 of waveform 86. Consequently, the half cycle 97 of the waveform 92, which is formed by adding the half cycles 93 and 95, is composed of the adjacent half cycles 94 and 96 of the waveform 86. Noise signals which would eliminate a half cycle of the biphase signal 86 thus would be ineffective in eliminating a half cycle of the waveform 92.

The signal 92, which is produced in the adder circuit 91, is supplied to a limiter 98 which produces an output signal having a rectangular waveform, such signal being shown at 99 in FIG. 15. This signal is supplied to the gating circuit 100 and is also supplied to the phase reference signal generator 101. The latter, which may comprise apparatus of the character disclosed and claimed in the aforementioned Ingham application, produces a first pulse signal 102 (FIG. 16) which is supplied to the gating circuit 100 and also to the recovery circuit 103. The gating circuit 100 produces a second pulse signal 104 (FIG. 17) which is also supplied to the recovery circuit 103.

The first pulse signal 102 is fixedly related in frequency and phase to the received biphase signal 86. As described in the Ingham application, the phase of this pulse signal is established by the aforementioned synchronizing signal. The second pulse signal 104 is indicative of the phase changes in the biphase signal.

The recovery circuit 103 is responsive to the pulse signals 102 and 104 to reproduce the two-level binary signal as represented by the waveform 105 of FIG. 18. This circuit comprises a conventional Eccles-Jordan circuit which is responsive to two input signals. As long as an uninterrupted train of pulses is supplied to it from the time gate 100, the circuit will produce a constant high level signal such as represented by the portion 106 of the waveform 105. However, whenever the output pulses from the gate 100 are interrupted by the omission of a pulse, as indicated at point 107 in FIG. 17, the corresponding gating pulse 108 will cause the circuit to assume its low level state as shown at 109 in FIG. 18. Resumption of the gate output pulses will cause the circuit to assume its high level state as shown. Thus, the two-level signal is reproduced, although it is delayed with respect to the original two-level signal 70 shown in FIG. 10. This delay, which is of no consequence, is necessary in order to derive the benefits of the use of the delay line 88 and in order to effect optimum gating.

Figure 4:
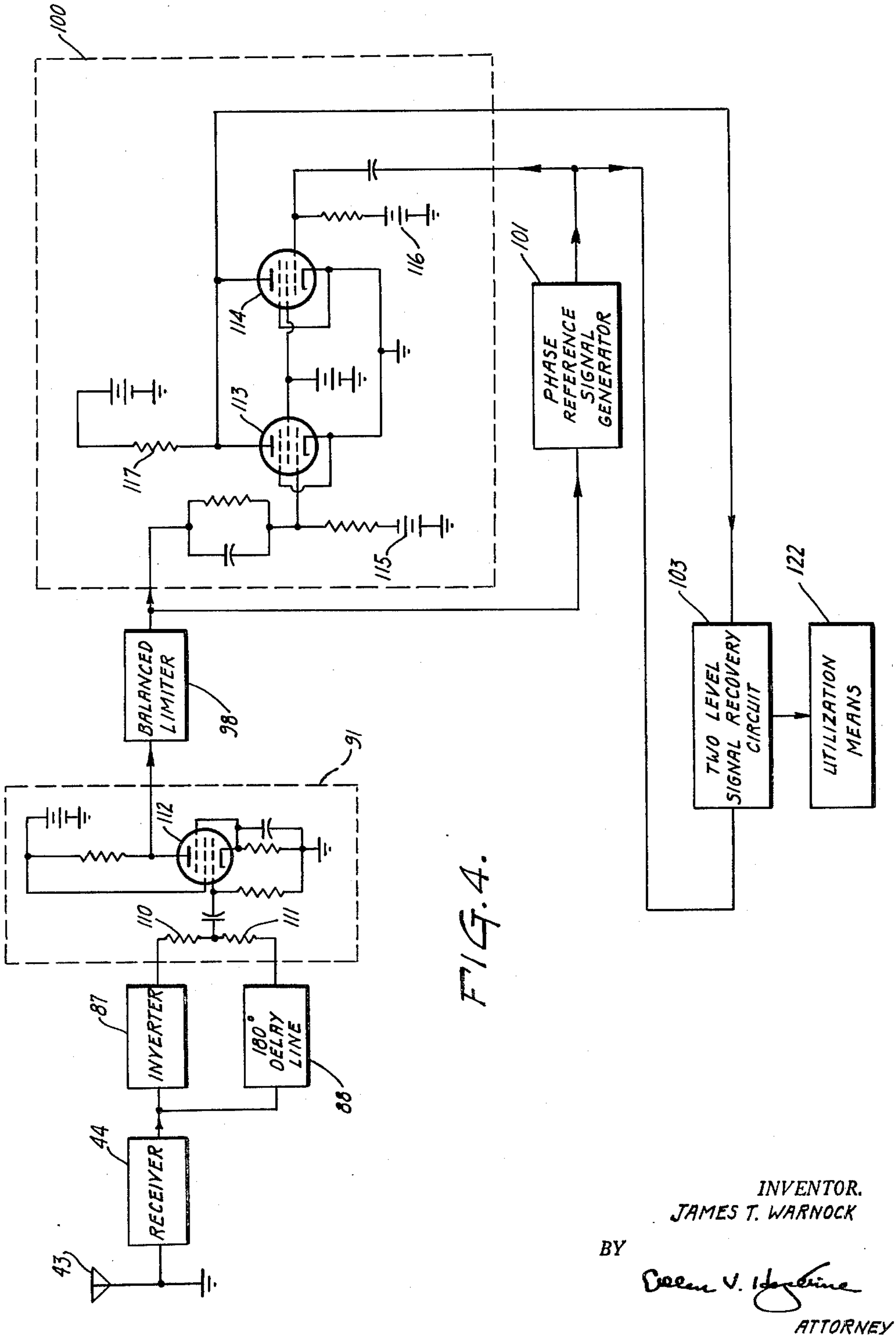
FIGURE 4 is a sufficiently detailed illustration of the apparatus at the receiving station to enable a clear understanding thereof.

Referring now to FIG. 4, in this figure the adder circuit 91 and the gating circuit 100 are shown in detail. The other components are shown in block form, as they are all conventional devices with the exception of the phase reference signal generator 101 which, as previously stated, is the subject of the aforementioned copending Ingham application.

As shown in FIG. 4, the adder circuit 91 is of simple form and includes a single vacuum tube stage. The signals from the inverter 87 and the delay line 88 are supplied to resistors 110 and 111, and the signal resulting from their summation is supplied to the input of tube 112. After double inversion by tube 112 and limiter 98, the signal is supplied to the gating circuit 100 and also to the phase reference signal generator 101.

The gating circuit 100 comprises pentodes 113 and 114 and the associated circuit components and connections. The cathodes of the two tubes are connected to ground, while the plates are connected to a common plate resistor 117. The control grid of tube 113 is biased negatively by the biasing means 115, while the control grid of tube 114 is biased positively by the biasing means 116. The signal from the limiter 98 is supplied to the control grid of tube 113, while the output signal of the generator 101 is supplied to the control grid of tube 114.

The pulses 102 (FIG. 16) are supplied by generator 101 and bear a definite phase relationship to the signal supplied to the gating circuit from the limiter. This relationship may be seen from FIGS. 15 and 16, wherein it can be seen that the pulses 102 occur 270° after the beginning of a cycle of signal 99. The waveform 99 (FIG. 15) which is supplied to the control grid of tube 113, will cause this tube either to be cut off or to be conductive. Thus, a positive portion of waveform 99, such as portion 118, will cause tube 113 to be conductive. During the conduction of tube 113 caused by portion 118 of waveform 99, the pulse 108 will be supplied to the control grid of tube 114 from the timing signal generator 101. However, due to the conduction of tube 113, pulse 108 will have no effect and there will be no output pulse from the gating circuit.

When a negative portion of the waveform 99, such as portion 119, is supplied to the control grid of tube 113, the plate current of that tube will be substantially cutoff. However, the plate potential will not increase substantially due to the conduction of tube 114. When the negative pulse 120 is supplied to the control grid of tube 114 from generator 101, the plate current of tube 114 is substantially cut off, thus producing a positive pulse at the plate of tube 114. This positive pulse is shown at 121 in FIG. 17.

As previously described the pulse signal from generator 101 and the pulse signal from the gating circuit 100 are supplied to the two-level signal recovery circuit 103. As also previously described this circuit includes a conventional Eccles-Jordan circuit which, in response to the signals 102 and 104 of FIGS. 16 and 17, produces the two-level binary signal 105 of FIG. 18 corresponding to the original two-level binary signal shown in FIG. 10. The signal output of the recovery circuit is supplied to utilization means 122, which may be any suitable load for such output.

From the foregoing description, it will be seen that this invention provides a novel system having the advantages hereinbefore set forth. While a preferred embodiment of the invention has been illustrated and described, it will be understood that the invention is not limited thereto but contemplates such modifications and further embodiments as may occur to those skilled in the art.

I claim:

1. In a system for the transmission and reception of information contained in a binary pulse signal wherein two digits are represented respectively by a pulse and an absence of a pulse at a predetermined baud rate, means for generating pulses at said rate, means for producing said binary pulse signal, a first bistable device responsive to said signal and the generated pulses for producing a first two-level signal wherein one level represents the presence of pulses and the other level represents the absence of pulses in said binary pulse signal, means for producing a second two-level signal by phase inversion of said first signal, means for producing at the same time a pulse signal having a pulse recurrence rate equal to twice said baud rate, means including a second bistable device for producing from said first and second two-level signals and the last-mentioned pulse signal a biphase signal having a frequency equal to said baud rate and having one phase when said first two-level signal is at one level and having another phase when said first two-level signal is at the other level, means for transmitting said biphase signal, means for receiving said biphase signal, means for producing a pulse signal fixedly related in frequency and phase to the received biphase signal, means for producing a pulse signal indicative of the phase changes in the received biphase signal, and means for reproducing from the latter two pulse signals said first two-level signal.

2. In a system for the transmission and reception of information contained in a binary pulse signal wherein two digits are represented respectively by a pulse and an absence of a pulse at a predetermined baud rate, means for producing a two-level signal wherein one level represents the presence of pulses and the other level represents the absence of pulses in said binary pulse signal, means for producing a biphase signal having a frequency equal to said baud rate and having one phase when said two-level signal is at one level and having another phase when said two-level signal is at the other level, means for transmitting said biphase signal, means for receiving said biphase signal, means for producing a delayed signal corresponding to said biphase signal, means for producing an inverted signal corresponding to said biphase signal, means for adding said delayed signal and said inverted signal to produce a resultant signal, means for producing from said resultant signal two pulse signals, one fixedly related in frequency and phase to the received biphase signal, and the other indicative of the phase changes in the received biphase signal, and means for reproducing from the latter two pulse signals the original two-level signal.

3. In a system for the transmission and reception of information contained in a binary pulse signal wherein two digits are represented respectively by a pulse and an absence of a pulse at a predetermined baud rate, means for producing a two-level signal wherein one level represents the presence of pulses and the other level represents the absence of pulses in said binary pulse signal, means for producing at the same time a pulse signal having a pulse recurrence rate equal to twice said baud rate, means for producing from said two-level signal and the last-mentioned pulse signal a biphase signal having a frequency equal to said baud rate and having one phase when said two-level signal is at one level and having another phase when said two-level signal is at the other level, means for transmitting said biphase signal, means for receiving said biphase signal, means for producing a delayed signal corresponding to said biphase signal, means for producing an inverted signal corresponding to said biphase signal, means for adding said delayed signal and said inverted signal to produce a resultant signal, means for producing from said resultant signal two pulse signals, one fixedly related in frequency and phase to the received biphase signal, and the other indicative of the phase changes in the received biphase signal, and means for reproducing from the latter two pulse signals the original two-level signal.

4. In a system for the transmission and reception of information contained in a binary pulse signal wherein two digits are represented respectively by a pulse and an absence of a pulse at a predetermined baud rate, means for producing a two-level signal wherein one level represents the presence of pulses and the other level represents the absence of pulses in said binary pulse signal, means for producing at the same time a pulse signal having a pulse recurrence rate equal to twice said baud rate, a bistable device connected to both said signal-producing means and operable by the produced signals to produce a biphase signal having a frequency equal to said baud rate and having one phase when said two-level signal is at one level and having another phase when said two-level signal is at the other level, means for transmitting said biphase signal, means for receiving said biphase signal, means for producing a delayed signal corresponding to said biphase signal, means for producing an inverted signal corresponding to said biphase signal, means for adding said delayed signal and said inverted signal to produce a resultant signal, means for producing from said resultant signal two pulse signals, one fixedly related in frequency and phase to the received biphase signal, and the other indicative of the phase changes in the received biphase signal, and means for reproducing from the latter two pulse signals the original two-level signal.

5. In a system for the transmission and reception of information contained in a binary pulse signal wherein two digits are represented respectively by a pulse and an absence of a pulse at a predetermined baud rate, means for generating pulses at said rate, means for producing said binary pulse signal, means responsive to said signal and the generated pulses for producing a two-level signal wherein one level represents the presence of pulses and the other level represents the absence of pulses in said binary pulse signal, means for producing at the same time a pulse signal having a pulse recurrence rate equal to twice said baud rate, means for producing from said two-level signal and the last-mentioned pulse signal a biphase signal having a frequency equal to said baud rate and having one phase when said two-level signal is at one level and having another phase when said two-level signal is at the other level, means for transmitting said biphase signal, means for receiving said biphase signal, means for producing a delayed signal corresponding to said biphase signal, means for producing an inverted signal corresponding to said biphase signal, means for adding said delayed signal and said inverted signal to produce a resultant signal, means for producing from said resultant signal two pulse signals, one fixedly related in frequency and phase to the received biphase signal, and the other indicative of the phase changes in the received biphase signal, and means for reproducing from the latter two pulse signals the original two-level signal.

6. In a system for the transmission and reception of information contained in a binary pulse signal wherein two digits are represented respectively by a pulse and an absence of a pulse at a predetermined baud rate, means for generating pulses at said rate, means for producing said binary pulse signal, a first bistable device responsive to said signal and the generated pulses for producing a two-level signal wherein one level represents the presence of pulses and the other level represents the absence of pulses in said binary pulse signal, means for producing at the same time a pulse signal having a pulse recurrence rate equal to twice said baud rate, means including a second bistable device for producing from said two-level signal and the last-mentioned pulse signal a biphase signal having a frequency equal to said baud rate and having one phase when said two-level signal is at one level and having another phase when said two-level signal is at the other level, means for transmitting said biphase signal, means for receiving said biphase signal, means for producing a delayed signal corresponding to said biphase signal, means for producing an inverted signal corresponding to said biphase signal, means for adding said delayed signal and said inverted signal to produce a resultant signal, means for producing from said resultant signal two pulse signals, one fixedly related in frequency and phase to the received biphase signal, and the other indicative of the phase changes in the received biphase signal, and means for reproducing from the latter two pulse signals the original two-level signal.

7. A receiving system for decoding a biphase information signal containing binary digital information coded at a baud rate represented by the frequency of the signal, said signal having binary components of opposite phase representative respectively of the two binary digits, said system comprising means for producing a delayed signal corresponding to said biphase signal, means for producing an inverted signal corresponding to said biphase signal, means for adding said delayed signal and said inverted signal to produce a resultant signal, means for producing from said resultant signal two pulse signals, one fixedly related in frequency and phase to the received biphase signal, and the other indicative of the phase changes in said biphase signal, and means for producing from said pulse signals a two-level binary signal containing the binary digital information of said biphase signal.

8. In a system for transmitting the information contained in a binary pulse signal wherein two digits are represented respectively by a pulse and an absence of a pulse at a predetermined baud rate, means for generating pulses at said rate, means for producing said binary pulse signal, a first bistable device responsive to said signal and the generated pulses for producing a first two-level signal wherein one level represents the presence of pulses and the other level represents the absence of pulses in said binary pulse signal, means for producing a second two-level signal by phase inversion of said first signal, means for producing at the same time a pulse signal having a pulse recurrence rate equal to twice said baud rate, means including a second bistable device for producing from said first and second two-level signals and the last-mentioned pulse signal a biphase signal having a frequency equal to said baud rate and having one phase when said first two-level signal is at one level and having another phase when said first two-level signal is at the other level, and means for transmitting said biphase signal.

References Cited in the file of this patent

UNITED STATES PATENTS

| | | |
|---|---|---|
| 1,559,642 | Nyquist | Nov. 3, 1925 |
| 1,882,698 | Alexanderson | Oct. 18, 1932 |
| 1,901,642 | Hansell | Mar. 14, 1933 |
| 1,922,282 | De Bellescize | Aug. 15, 1933 |
| 2,633,564 | Fleming | Mar. 31, 1953 |
| 2,676,245 | Doelz | Apr. 20, 1954 |
| 2,700,155 | Clayden | Jan. 18, 1955 |
| 2,723,080 | Curtis | Nov. 8, 1955 |
| 2,734,186 | Williams | Feb. 7, 1956 |
| 2,764,463 | Lubkin | Sept. 25, 1956 |
| 2,853,357 | Barber | Sept. 23, 1958 |
| 2,864,077 | De Turk | Dec. 9, 1958 |
| 2,896,192 | Husman | July 21, 1959 |

OTHER REFERENCES

Fundamentals of Electronics, AF Manual 101–8, Dept. of Air Force, Washington, D.C., July 1, 1957, pp. 290–297.